United States Patent

[11] 3,564,270

[72] Inventor Glenn Eggert
    Milwaukee, Wis.
[21] Appl. No. 816,717
[22] Filed Apr. 16, 1969
[45] Patented Feb. 16, 1971
[73] Assignee Houdaille Industries, Inc.
    Buffalo, N.Y.

[54] LOGIC CIRCUIT FOR BUFFING MACHINE
    17 Claims, 4 Drawing Figs.
[52] U.S. Cl.................................................. 250/223;
    15/21; 51/326, 51/382
[51] Int. Cl...................................................... B60s 3/00,
    C06m 3/02
[50] Field of Search............................................ 250/208,
    209, 214, 215, 219 (RG), 222, 223, 224; 51/352,
    354, 382, 326; 15/21

[56] References Cited
    UNITED STATES PATENTS
    2,928,112  3/1960  Nelson et al. .................. 15/21
    3,035,293  5/1962  Larson .......................... 15/21
    3,171,621  3/1965  Steinbach et al. ............. 246/182
    3,443,270  5/1969  Smith ............................ 15/21
    3,451,085  6/1969  Hay ............................... 15/21

Primary Examiner—Roy Lake
Assistant Examiner—E. R. LaRoche
Attorney—Hill, Sherman, Meroni, Gross & Simpson ABSTRACT: An automatic system for buffing a moving object which includes means for developing a series of pulses in response to the rate of movement of the object to be buffed and for utilizing the pulses so developed to sequentially apply a predetermined buffing force to the moving object. A solid-state logic circuit is employed to control the operation of a solid-state counter. The counter in turn utilizes each count for coupling a power level to the buffing machine so that a given power level is related to each pulse through the counter. Hence, a given power level is related to each increment of movement of the object being buffed. A series of gate circuits sense the presence of the object to be buffed and sets a ring counter. When the object to be buffed is sensed by the logic circuit, the ring counter is opened to a pulse generator which is sequenced to the rate of movement of the object being buffed. Effectively, then, the ring counter is counting increments of movement of the object being buffed and utilizing the sequential change of state of individual flip-flops of the ring counter to couple the various power levels to the buffing machine. Essentially, the ring counter biases on respective numbers of transistors with each count, and the power level coupled to each transistor is then applied directly to the buffing machine for generating the instantaneous force required to buff the moving object.

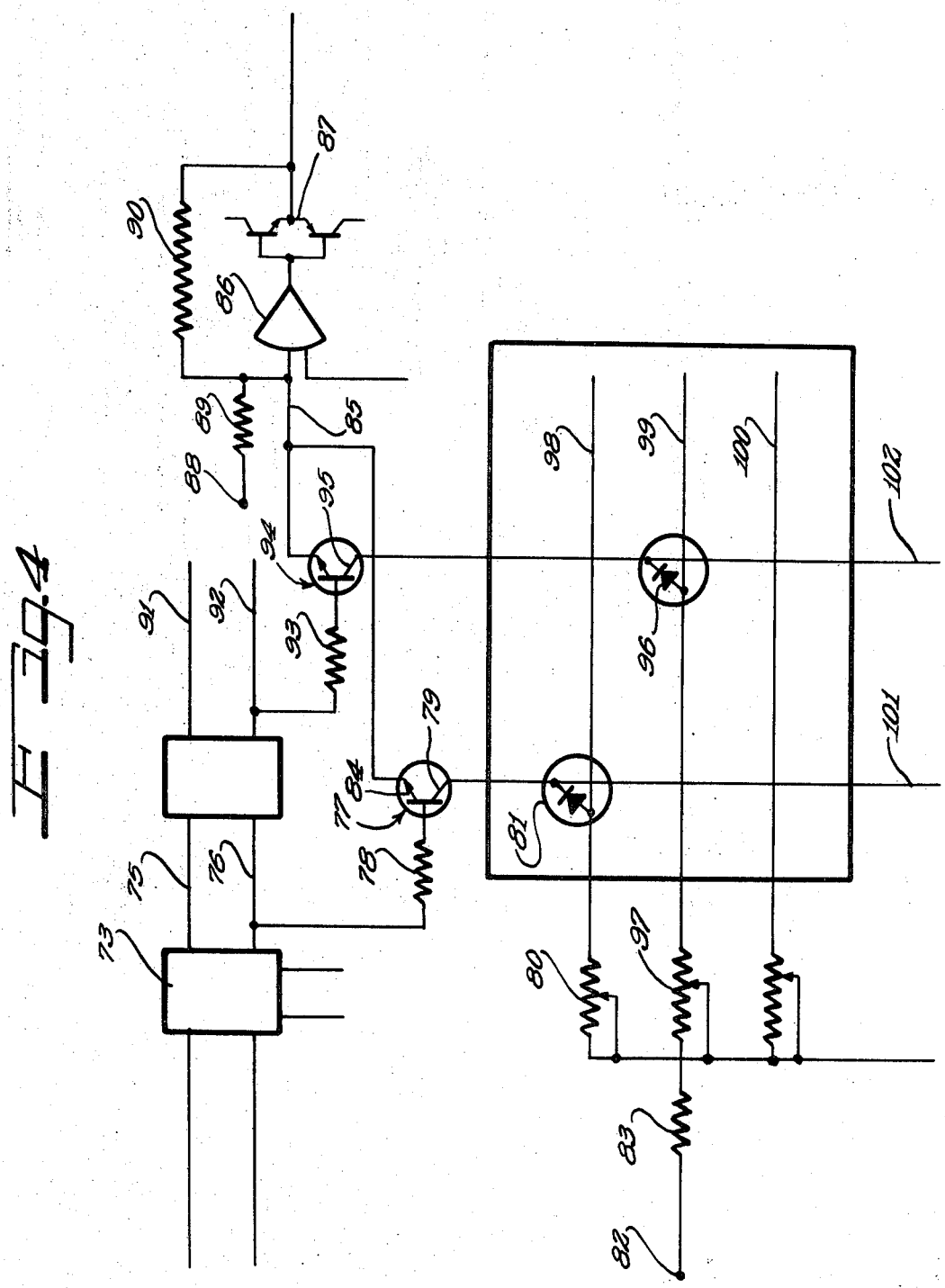

LOGIC CIRCUIT FOR BUFFING MACHINE

BACKGROUND OF THE INVENTION

Field of the Invention

The field of art to which this invention pertains is automatic systems for instantaneously applying various buffing power levels to a buffing machine for the purpose of buffing a moving object such as on a conveyor or the like. By applying various power levels to the buffing machine, various contoured objects can be buffed such as automobile bumpers or the like. For instance, an automobile bumper may be divided into 100 increments of length and a separate buffing force by assigned to each increment. As the bumper moves beneath the buffing head then the buffing machine must sense the presence of each increment and apply the correct buffing force in order to uniformly buff the irregular contour of the bumper. The present invention relates to such an automatic system and in particular relates to a logic system for accomplishing the correct instantaneous coupling between preselected power levels and the buffing apparatus.

SUMMARY OF THE INVENTION

It is an important feature of the present invention to provide an automatic control system for a buffing apparatus.

It is another feature of the present invention to provide means for instantaneously varying the power level to a buffing machine in accordance with an automatic sequencing program.

It is an important object of the present invention to provide an improved automatic control system for a buffing machine.

It is also an object of the present invention to provide a logic circuit for automatically controlling the power levels to a buffing machine.

It is another object of the present invention to provide a control circuit for a buffing apparatus which includes a ring counter for sequentially coupling varying power levels to the buffing machine.

It is an additional object of the present invention to provide a solid-state logic circuit for sensing the presence of an object to be buffed and for controlling the operation of a ring counter so as to regulate the power applied to the buffing head as the object being buffed moves in a path transverse to the application of the buffing force.

It is a further object of the present invention to provide a control circuit for a buffing apparatus which generates a series of pulses in response to the incremental forward movement of an object being buffed on a conveyor and which utilizes a logic circuit to couple the series of pulses so generated to a ring counter, wherein the ring counter controls the application of force to the buffing machine during the increment of the respectively generated pulses.

It is also an object of the present invention to provide a control circuit for a buffing machine which includes a ring counter for biasing a series of transistors on and off in response to the change in state of the counter and wherein the biasing of such transistors causes a power level coupled to each of the transistors to be coupled to the buffing apparatus such that the counting of the ring counter corresponds to the application of a preselected pattern of forces to the buffing head for buffing an irregularly contoured object such as an automobile bumper or the like.

It is another object of the present invention to provide a control circuit as described above wherein a series of potentiometers are coupled from a common power source to one of the output terminals of respective numbers of transistors and wherein these transistors are coupled directly to a buffing machine so that the power supplied to the buffing machine is dependent upon the conduction time of the respective transistors and dependent upon the setting of the respective potentiometers which are coupled in the output circuits of the individual transistors.

These and other objects, features and advantages of the present invention will be understood in greater detail from the following description in the associated drawings wherein reference numerals are utilized to designate an illustrative embodiment.

BRIEF DESCRIPTION OF THE DRAWINGS

FIG. 4 is a schematic showing the coupling of the control transistors to the outputs of the flip-flop circuits which comprise the ring counter and showing how the power is applied from various potentiometers through the respective transistors to the amplifier which controls the buffing power, all of this occurring when the respective transistors are biased on by the proper change in state of the flip-flop circuits of the ring counter.

DESCRIPTION OF THE PREFERRED EMBODIMENT

The automatic buffing control circuit of the present invention provides means for generating pulses which are indicative of the incremental forward movement of an object being buffed on a moving conveyor or the like. These pulses are normally prevented from passing to a ring counter circuit by a logic circuit which blocks the train of pulses when an object to be buffed is not in the buffing position. However, when the object is in the buffing position, the continuous train of pulses passes to a ring counter and a sequence of counts beings, terminating only by the number of flip-flop circuits in the ring counter. Effectively, each count in the ring counter represents the forward incremental movement of the object being buffed. By utilizing each change of state of the counter which corresponds to one count to trigger a transistor circuit into a conducting state, a series of predetermined power levels can be coupled via these transistors to the buffing machine thereby controlling the power of the buffing apparatus at each point along the object being buffed. In this way, irregularly contoured objects such as automobile bumpers or the like can be uniformly buffed in accordance with a preplanned program of buffing power levels for each increment of length of the automobile bumper.

Figure 1:
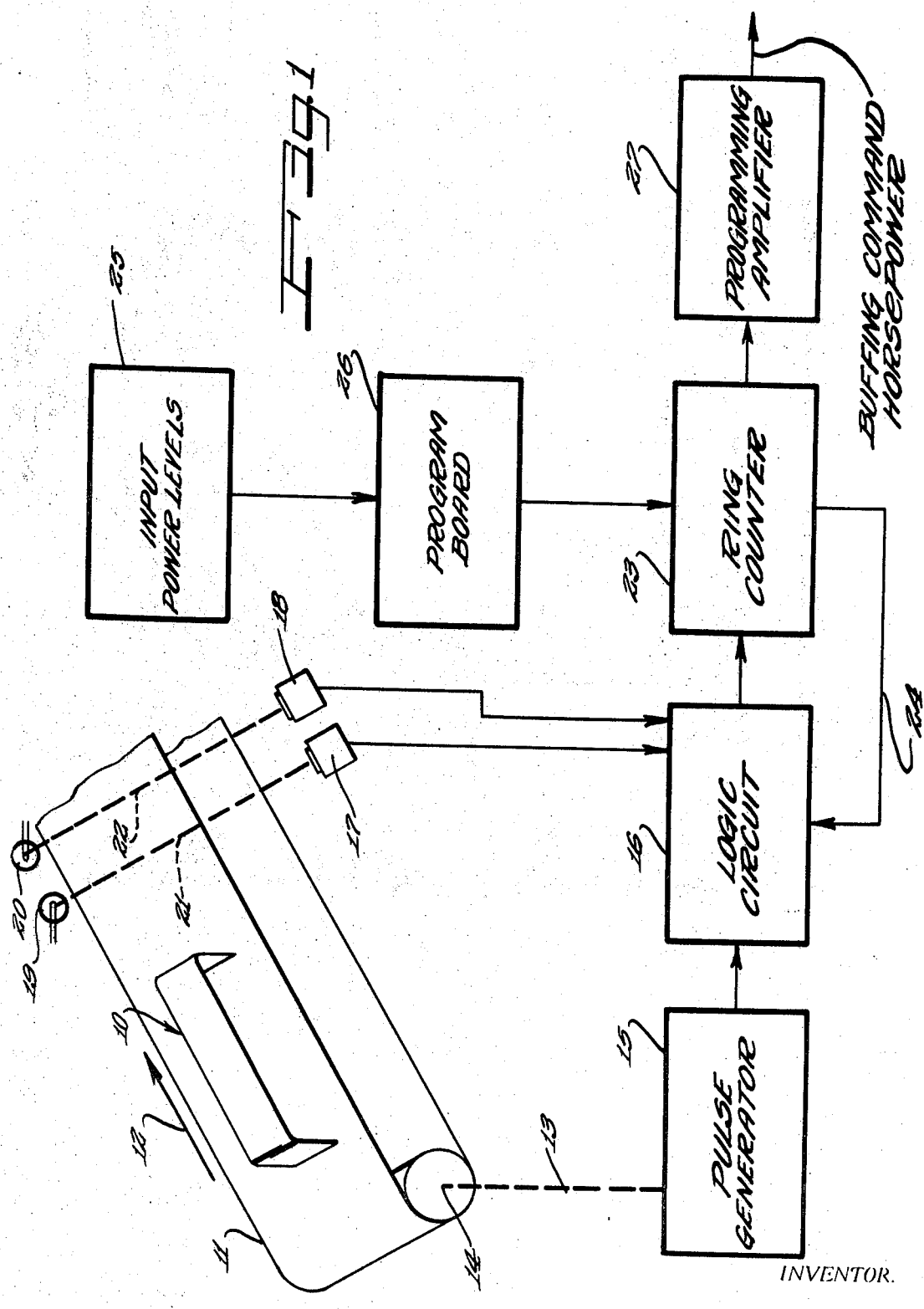
FIG. 1 is a block diagram illustrating the various circuits and apparatus which are coupled together to form an automatic buffing control system according to the present invention.

The automatic control system of the present invention is illustrated schematically in FIG. 1 wherein an automobile bumper 10 is shown to be moving on a conveyor system 11. The direction of movement is indicated by an arrow 12. The movement of the bumper 10 along the conveyor is sensed by a coupling 13 from the conveyor as at the roller 14 to the a pulse generator 15.

The pulse generator 15 develops a series of pulses which repeat at a rate which is dependent on the forward movement of the conveyor and hence of the bumper 10. Accordingly to a stationary observer, each pulse will correspond to a given increment of length of the automobile bumper 10.

The pulse generator 15 is coupled to a logic circuit 16. The logic circuit 16 receives information from a pair of relays 17 and 18. The relays 17 and 18 may be photo relays triggered by a light signal from a pair of lamps 19 and 20 which are disposed oppositely of the conveyor 11. When the bumper 10 moves into the path of the light means 21 and 22, the photo relays generate the proper signal for activating the logic circuit 16. The logic circuit then opens a path from the pulse generator 15 to a ring counter 23. The ring counter 23 also feeds back to the logic circuit as at 24 to trigger the logic circuit into a blocking state when the count is complete.

A number of input power levels are developed as at 25. These power levels are coupled to a program board 26 and hence to the ring counter 23. In this way, as the ring counter changes state corresponding to each respective count of the pulses from the pulse generator 15, a given input power level may be coupled through the ring counter to a program amplifier 27. The output of the amplifier 27 is the buffing command horse power and is coupled directly to the buffing apparatus.

Figure 2:
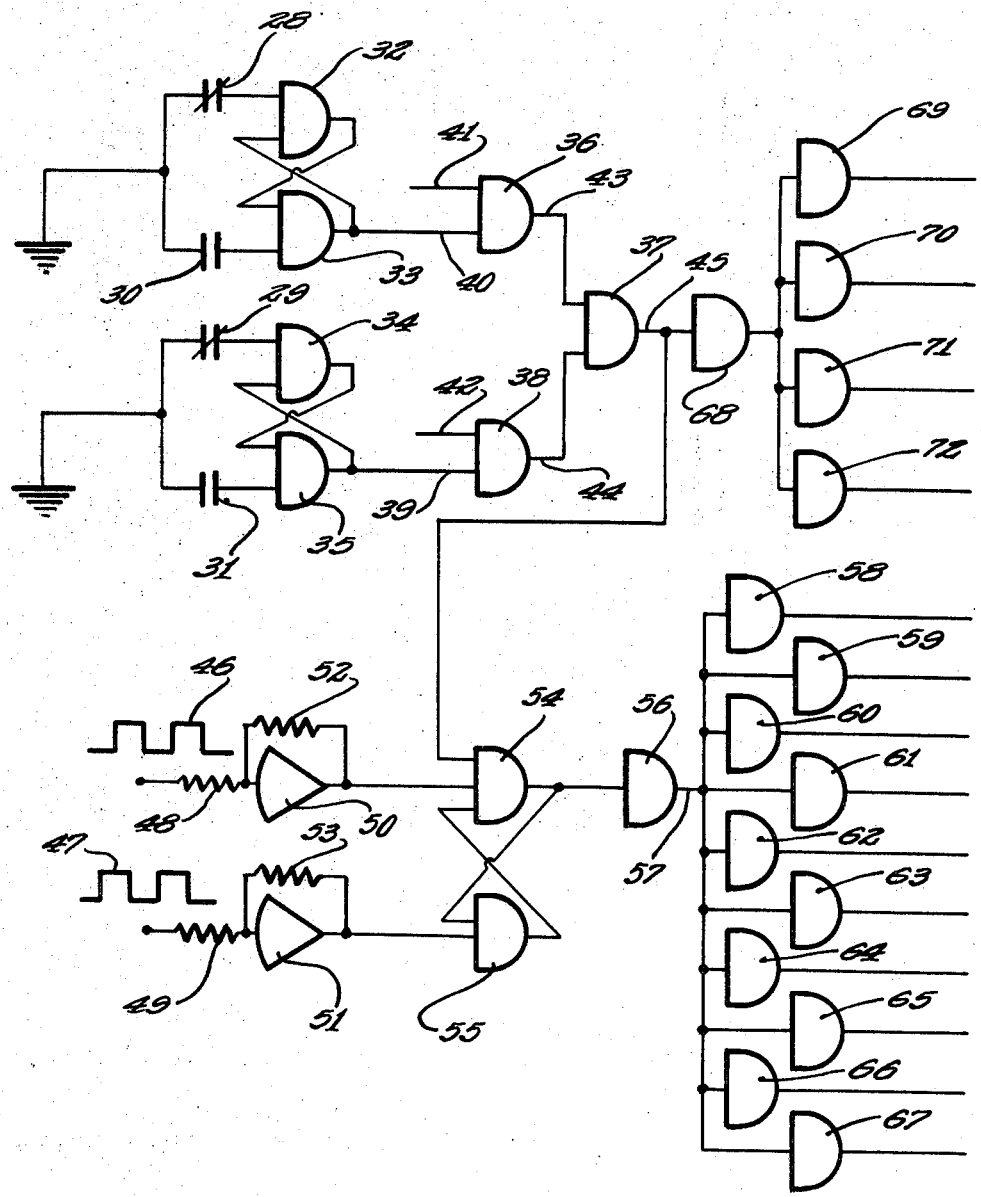
FIG. 2 is a schematic diagram of a series of gate circuits which together make up the logic circuit for setting and triggering the ring counter of the present invention.

In FIG. 2 the logic circuit is shown in include a pair of relays 28 and 29. Each of these relays have relay contacts 30 and 31 associated therewith.

A pair of NOR gates 32 and 33 are associated with the relay 28 and a second pair of similar gates 34 and 35 are associated with the relay 29. It has been found that the toggle-type connection shown in FIG. 2 prevents the bounce associated with the closing of the relay contacts from triggering the logic circuit.

With the relay 28 closed thereby initiating the automatic cycle, the output of the gate 33 may be said to be in state 1. The relay 29 may be closed by the presence of a bumper breaking the contact of the photo relays. When the bumper is not present, the output of the gate 35 may be said to be in state 0. As is well understood in the art, the NOR gates shown in this drawing may have either one of the two indicated states.

Three further gates 36, 37 and 38 are provided to develop a signal which both sets the flip-flop circuits and develops the proper signal for triggering the flip-flops by means of the pulse generator 15.

Assuming once again that the bumper is not present, the input 39 of the gate 38 will be in state 0 and the input 40 of the gate 36 will be in state 1.

The connections to the respective terminals 41 and 42 of the gates 36 and 38 are from the opposing output terminals of the last flip-flop in the ring counter. As is well understood in the art, these are in opposing states. In this case, the terminal 41 is in state 0, while the terminal 42 is in state 1. As a result the output 43 of the gate 36 will be in state 1 and the output 44 of the gate 38 will also be in state 1. As will be understood from the operation of NOR gates, this means that the output of the gate 37 as at 45 will be in state 0.

A pair of pulses 46 and 47 are applied to input resistors 48 and 49 and to respective amplifiers 50 and 51. Resistors 52 and 53 are coupled across their respective amplifiers 50 and 51.

The output of the amplifiers 50 and 51 are coupled to the input of NOR gates 54 and 55. The NOR gates 54 and 55 are coupled together similar to the gates 32 and 33 and 34 and 35 as shown above. The output of the gate 54 is then coupled to the input of a further gate 56. The output of the gate 56 as at 57 is coupled to the inputs of 10 gates 58 through 67. The outputs of the gates 58 through 67 are coupled to the trigger terminals of a series of flip-flop circuits in the ring counter 23 (FIG. 1).

When the output of the gate 37 is in state 0, the output of gate 54 is in state 1 regardless of the inputs applied to the amplifiers 50 and 51. Hence, in this condition the trigger pulses 46 and 47 as generated by the pulse generator 15 will not trigger the flip-flop circuits of the ring counter.

As previously mentioned, when the relay 29 is open, the output of the gate 37 is in state 0. The output of a further gate 68 is then in state 1. A series of further gates 69 through 72 which are connected directly to the output of the gate 68 have their outputs at state 0 which means that the set terminals of the flip-flop circuits which are coupled to the outputs of the gates 69 through 72 are in a position such that trigger signals will not trigger the flip-flops. Both in the case of the gates 69 through 72 and the gates 58 through 67, the number of gates provided are required to share the current drain of the number of flip-flops which are used in the circuit of the present invention. In particular, 100 flip-flop circuits are used corresponding to 100 increments of length of the bumper being buffed. When the relay 29 closes due to the presence of a bumper being present beneath the buffing wheel, the output of the gate 37 changes from state 0 to state 1, and the output of the gate 68 changes from state 1 to state 0. Similarly the output of the gates 69 through 72 change from state 0 to state 1 thereby releasing the set terminals of the flip-flop circuits and allowing them to be triggered by trigger signals.

Since the output of the gate 37 is at state 1, the input of the gate 54 is also at state 1. As will be well understood in the art, this means that the trigger signals can then produce changes in the state of the output of the gate 54 and hence at the output of the gate 56 and at the outputs of the respective gates 58 through 67. In this way, the trigger signals 46 and 47 will pass to the output of the respective gates and to the trigger terminals of the flip-flop circuits which comprise the ring counter of the present invention for triggering the same and hence for applying various power levels to the buffing machine.

FIG. 4 shows how the flip-flop circuits are utilized to connect individual power levels to the buffing machine.

In particular, a series of flip-flops such as the flip-flops 73 and 74 are connected in series to form the ring counter 23 (FIG. 1). Any number of flip-flops may be used, however, the present invention contemplates 100 flip-flops as being a useable member for polishing a standard automobile bumper.

The outputs of the flip-flop 73 are identified by numerals 75 and 76. As is well understood, these outputs are of opposing states.

When the output 76 changes from a low voltage to a high voltage state, a transistor 77 is biased into conduction through a biasing resistor 78 which is connected in series with the base terminal thereof. The transistor 77 has its collector 79 coupled to a potentiometer 80 through a connection diode 81. A voltage source at a terminal 82 establishes a power level for the collector 79 through a common resistor 83 and the potentiometer 80 directly to the collector 79. The emitter 84 of the transistor 77 is then coupled to a common line 85 which provides the input to an amplifier 86, a further amplifier stage 87. The power supply for the amplifiers 86 and 87 is coupled from a terminal 88 through a resistor 89 to the input 85 directly and through a further resistor 90 to the output of the amplifier 87.

In a similar manner, the flip-flop circuit 74 has a pair of output terminals 91 and 92. The terminal 92 is coupled through a resistor 93 to the base terminal of a transistor 94. The transistor 94 has a collector 95 coupled through a diode 96 to a potentiometer 97 and hence to the common resistor 83 and the common power supply 82. The emitter of the transistor 94 is then coupled to the input of the amplifier 86 as described above.

It can be seen that a program board can be built up by the use of a number of horizontal conductors such as the conductors 98, 99 and 100. A number of vertical conductors such as the conductors 101 and 102 may be positioned as shown in FIG. 4 to provide crossover points at each of the horizontal conductors. In this way a pin or the like containing a diode such as the diodes 81 and 96 may be inserted in the program board to make a coupling between the horizontal and vertical conductors and thereby to select a given power level for each of the collectors of the respective transistors which are associated with the 100 flip-flop circuits.

Figure 3:
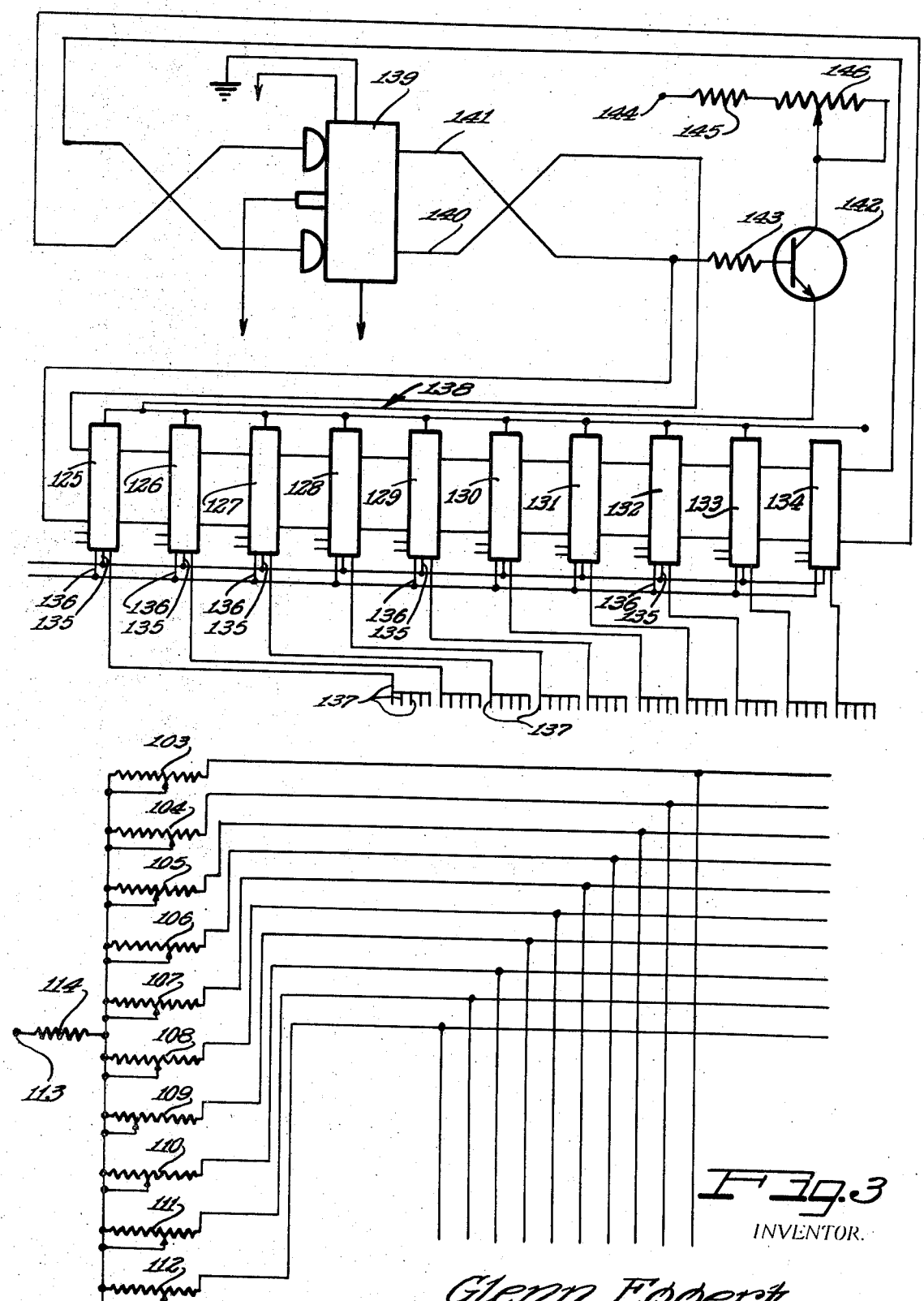
FIG. 3 shows a portion of the control circuit of the present invention which is coupled to the circuit portion shown in FIG. 2.

In FIG. 3 a program board is shown schematically in which a number of resistors 103 through 112 are shown to be potentiometers which are coupled to a common power source at a terminal 113 through a common resistor 114. These resistors are then coupled to a number of horizontal conductors 115 through 124.

A number of printed circuit boards 125 through 134 are shown in FIG. 3, and each of these printed circuit boards may contain a number of flip-flop circuits as shown in FIG. 4.

Each of the printed circuit boards has a set terminal 135 which is coupled to the outputs of the gates 69 through 72. Also, the printed circuit boards 125 through 134 have a number of trigger terminals 136 which are coupled to the outputs of the gates 58 through 67 also shown in FIG. 2.

In this case, each of the printed circuit boards has five flip-flop circuits, and hence the series of vertical conductors 137.

By inserting a pin at any point, at any point where the vertical conductors cross with the horizontal conductors a proper connection can be had as explained in connection with FIG. 4.

The outputs of the printed circuit boards are taken off at a common line 138 to provide the respective power levels to the buffing motor.

The last flip-flop is shown separately as flip-flop circuit 139 and has a pair of outputs coupled from the output of the printed circuit board 134. Where the mass pulse is received, the last flip-flop 139 changes state as is well understood in the art. After the last pulse is received the output terminal 140 goes to 0 and the output terminal 141 goes to state 1 which stops the counting until relay 29 is again energized by the presence of a bumper.

At the same time, when the terminal 141 goes to state 1, a further transistor 142 is biased on through a base resistance 143 to couple a negative power from a power supply 144 through a pair of resistors 145 and 146 to the common output line 138 for lifting the buffing head off the bumper since the cycle is terminated.

In this way, the counting circuit is used to apply the respective power levels for the increments of length on the bumper to achieve uniform buffing results automatically.

I claim:

1. In an automatic buffing system having a buffing head for buffing a moving object, a control circuit comprising:
   means for generating a series of pulses in response to the movement of the object being buffed;
   solid-state counter means;
   means for coupling pulses from said pulse-generating means to said solid-state counter means;
   a variable level power supply coupled to said buffing head; and
   means responsive to the counting of said solid-state counter means for selecting a given power level from said variable level power supply to drive said buffing head into variable force contact with the object being buffed.

2. A control circuit in accordance with claim 1 wherein said solid-state counter means comprises a ring counter.

3. A control circuit in accordance with claim 1 wherein said coupling means comprises a logic circuit for developing a logic signal which prevents the passage of pulses to said solid-state counter when the object being buffed is not in a buffing position and which otherwise develops a signal to pass pulses to said solid-state counter.

4. A control circuit in accordance with claim 1 wherein said means for selecting a given power level from said variable level power supply comprises a series of solid-state switching elements intercoupled between said power supply and said buffing head and wherein each of said solid-state switching elements is biased into an on or off state by the respective counts of said solid-state counter means.

5. In an automatic buffing system having a buffing head for buffing a moving object, a control circuit comprising:
   means for generating a series of pulses in response to the movement of the object being buffed;
   solid-state counter means;
   means for coupling pulses from said pulse-generating means to said solid-state counter means;
   said solid-state counter means including a number of series connected flip-flop circuits;
   each of said flip-flop circuits having a relatively low voltage output state and a relatively high voltage output state;
   a variable level power supply coupled to said buffing head; and
   means responsive to the counting of said solid-state counter means for selecting a given power level from said variable level power supply to drive said buffing head into variable force contact with the object being buffed.

6. A control circuit in accordance with claim 5 wherein said means for selecting a given power level from said variable level power supply comprises a number of solid-state switching devices each having a given power level coupled to one of its output terminals and each having the output of one of said flip-flop circuits coupled to one of its input terminals, whereby the switching action of said solid-state switching devices is controlled by the output state of said flip-flop circuits.

7. A control circuit in accordance with claim 6 wherein a logic circuit is provided to interrupt the passing of pulses to said solid-state counter means when the object being buffed is not in a desired position relative to the buffing head.

8. A control circuit in accordance with claim 7 wherein said logic circuit includes a number of NOR gates and means for applying a blocking signal to at least one of said NOR gates and wherein pulses from said pulse-generating means are coupled to an input of said one NOR gate with the output thereof being coupled to the trigger terminals of said flip-flop circuits.

9. A control circuit in accordance with claim 8 wherein a pair of sensors are provided to detect the presence of an object being buffed and wherein said logic circuit includes first and second logic networks having inputs coupled to each of said sensors for developing respective logic signals indicative of the presence or absence of an object being buffed beneath each of said sensors.

10. A control circuit in accordance with claim 6 wherein a negative power level is provided to be coupled to drive said buffing head in response to the last triggered flip-flop of said solid-state counter means to raise the buffing head from the object being buffed.

11. In an automatic buffing system having a buffing head and associated drive means for buffing an object moving transversely of the buffing head, a control circuit comprising:
   means for generating a series of pulses, each pulse being generated simultaneously with an incremental forward movement of the object being buffed relative to the buffing head;
   solid-state counter means;
   means for coupling pulses from said pulse-generating means to said solid-state counter means when the object being buffed reaches a desired point in its path of travel relative to the buffing head;
   a number of different level power sources;
   means responsive to each count of said counter means for coupling one of said different level power sources to the buffing head drive means; and
   whereby a given power level is applied to said buffing head in response to each increment of travel of the object being buffed as determined by said pulse-generating means.

12. A control circuit in accordance with claim 11 wherein a number of solid-state switching devices are provided, each of said solid-state switching devices having an input terminal and a pair of output terminals, one of said output terminals of each of said solid-state switching devices being coupled to one of said number of different level power sources, the other of said output terminals is coupled to said buffing head drive means, and the input terminal of each of said solid-state switching devices being coupled to said solid-state counter means.

13. A control circuit in accordance with claim 12 wherein said solid-state counter means comprises a number of series connected flip-flop circuits having first and second output states and wherein the output of said flip-flop circuits are coupled respectively to the input terminals of said solid-state switching devices.

14. A control circuit in accordance with claim 13 wherein said solid-state switching devices comprise transistors and wherein the on and off state of said transistors is determined by the bias provided by the output of the respectively coupled flip-flop circuits.

15. A control circuit in accordance with claim 13 wherein said different level power sources provided by a number of variable resistors coupled to a constant power source and wherein each of said resistors are coupled to one of the output terminals of said transistors to provide a predetermined power drive for said buffing head when the respective transistors are turned on by the action of said flip-flop circuits.

16. The combination comprising:
a buffing head and a drive means therefor;
a conveyor for moving a bumper beneath said buffing head;
means responsive to the movement of said conveyor for generating a series of pulses;
counter means for counting the pulses during the time the bumper is passing beneath the buffing head;
said counter means generating an output signal for each count; and
means using said respective output signals to control the power delivered to the buffing head drive means.

17. The combination of claim 16 wherein said counter means comprises a ring counter and wherein a number of transistors are biased on and off by the counting action of said ring counter to couple variable power levels to said buffing head drive means as required by the instantaneous position of said buffing head in its path of travel transversely of said buffing head.